United States Patent [19]

Nishikawa et al.

[11] Patent Number: 5,030,521

[45] Date of Patent: Jul. 9, 1991

[54] MAGNETIC RECORDING MEDIUM USING A FATTY ACID ESTER LUBRICANT WHEREIN THE ALCOHOL COMPONENT IS BRANCHED AT THE NUMBER ONE CARBON POSITION

[75] Inventors: Yasuo Nishikawa; Takao Ohya; Hajime Miyatsuka, all of Kanagawa, Japan

[73] Assignee: Fuji Photo Film Co., Ltd., Kanagawa, Japan

[21] Appl. No.: 183,875

[22] Filed: Apr. 20, 1988

[30] Foreign Application Priority Data

Apr. 20, 1987 [JP] Japan .................................. 62-96805

[51] Int. Cl.$^5$ .............................................. G11B 23/00
[52] U.S. Cl. ...................................... 428/694; 428/695; 252/56 R
[58] Field of Search ................ 428/695, 694, 425.9, 428/900; 252/56 R

[56] References Cited

U.S. PATENT DOCUMENTS

| | | | |
|---|---|---|---|
| 3,809,652 | 5/1974 | Brennan | 252/56 R |
| 4,420,540 | 12/1983 | Ogawa et al. | 428/457 |
| 4,675,250 | 6/1987 | Kanai et al. | 428/403 |
| 4,701,372 | 10/1987 | Akiyama et al. | 428/323 |
| 4,731,292 | 3/1988 | Sasaki et al. | 428/425.9 |
| 4,748,090 | 5/1988 | Yamamoto et al. | 428/694 |
| 4,786,551 | 11/1988 | Ootani et al. | 428/323 |

*Primary Examiner*—Merrell C. Cashion, Jr.
*Assistant Examiner*—Stevan A. Resan
*Attorney, Agent, or Firm*—Sughrue, Mion, Zinn, Macpeak & Seas

[57] ABSTRACT

A magnetic recording medium comprises a nonmagnetic support and a magnetic recording layer containing a ferromagnetic powder which is provided on the support. The magnetic recording layer contains a binder resin having a acid residue or a salt thereof and a fatty acid ester compound having the formula (I):

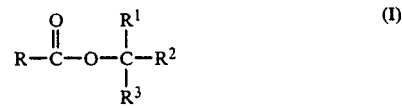

wherein R is a hydrocarbon group having 11-21 carbon atoms, $R^1$ is hydrogen atom or a hydrocarbon group having 1-3 carbon atoms, and $R^2$ and $R^3$ are the same or different and each is a hydrocarbon group having 1-8 carbon atoms. The total number of carbon atoms contained in $R^1$, $R^2$ and $R^3$ being not less than 3 carbon atoms. Alternatively, the fatty acid ester can be coated on the magnetic layer.

9 Claims, No Drawings

MAGNETIC RECORDING MEDIUM USING A FATTY ACID ESTER LUBRICANT WHEREIN THE ALCOHOL COMPONENT IS BRANCHED AT THE NUMBER ONE CARBON POSITION

BACKGROUND OF THE INVENTION

1. Field of the Invention

The present invention relates to an improved magnetic recording medium comprising a nonmagnetic support and a magnetic recording layer.

2. Description of Prior Art

A magnetic recording medium (hereinafter also referred to as a magnetic tape) such as an audio tape, a video tape or a recording medium used in a computer system basically comprises a nonmagnetic support and a magnetic recording layer provided on the support. The magnetic recording layer comprises a ferromagnetic powder such as a needle crystalline powder of $\gamma$-$Fe_2O_3$, Co-containing ferromagnetic iron oxide or $CrO_2$ dispersed in a binder. Recently, a demand for a higher density recording system has increased, and hence a magnetic recording medium using a ferromagnetic alloy powder mainly containing metals such as iron, nickel and cobalt has been widely employed in place of the conventional oxide-type ferromagnetic powder. The ferromagnetic alloy powder is high in both of a coercive force (Hc) and a residual flux density (Br), so that a magnetic recording medium using such powder can afford recording of higher density. For these reasons, the ferromagnetic alloy powder can be suitably employed for magnetic recording media of higher density recording system.

Especially in a video tape, requirement for extremely high density recording has increased in accordance with utilization of measures of using a short recording wavelength or narrowing track width, and hence the ferromagnetic alloy powder has been widely used in place of the conventional oxide-type ferromagnetic powder.

In the case of using the ferromagnetic alloy powder, it is known that much higher density recording can be attained by smoothening the surface of a magnetic recording layer containing the ferromagnetic alloy powder, and thereby the resulting magnetic recording medium can be enhanced in the electromagnetic conversion characteristics. However, when the surface of the magnetic recording layer is too smooth, a friction coefficient given by the contact between the magnetic recording layer and a member of a recording device increases in the course of running of the recording medium such as a video tape. As a result, the magnetic recording layer of the recording medium is apt to be easily damaged or easily separated from the support even when the recording medium is used for a short period of time. Particularly, in the case of a video tape, since the video tape runs at a high speed in contact with a video head, the ferromagnetic powder tends to easily drop off from the recording layer in the course of running to cause occurrence of clogging on the head. Accordingly, the magnetic recording layer of the video tape is desired to be improved in running durability.

For improving the running durability of the magnetic recording layer, it has been proposed to incorporate an abrasive (i.e., hard particles) such as corundum, silicon carbide or chromium oxide into the recording layer. In this case, however, the effect of incorporation of an abrasive is shown only where the abrasive is incorporated in a large amount. However, a magnetic recording layer containing a large amount of an abrasive likely causes extreme abrasion of a magnetic head employed in contact with the recording layer. Further, the incorporation of a large amount of an abrasive into the recording layer is unfavorable from the viewpoint of enhancement of the electromagnetic conversion characteristics of the resulting recording medium which are obtained by measures of smoothening the surface of the recording layer.

It has been also proposed that a lubricant such as a fatty acid or an ester of a fatty acid and an aliphatic alcohol is incorporated into the recording layer to lower the above-mentioned friction coefficient.

Now with wide spread of a portable video tape recorder, a video tape is expected to be employed under severe conditions such as a condition of a low temperature and a condition of a high temperature and a high humidity. Therefore, the video tape is required to hardly vary in the running durability and show stable durability in the course of running even under such severe conditions. However, the above-mentioned conventional lubricants hardly improve the running durability of the recording medium to a satisfactory level.

As described before, a ferromagnetic alloy powder has been widely employed as a replacement for the conventional ferromagnetic powder with respect to a video tape or a floppy disc, as the size of such recording medium has been made smaller for ultization of a short recording wavelength or a narrow track width. The ferromagnetic alloy powder can relatively improve the electromagnetic conversion characteristics of the resulting medium but hardly improves the running durability thereof to a satisfactory level, so that the magnetic recording medium using such ferromagnetic alloy powder is desired to be improved in the running endurance.

A magnetic recording layer of a recording medium can be formed on a nonmagnetic support by a conventional coating method, that is, a method of coating a magnetic paint comprising a ferromagnetic powder dispersed in a binder over the support. Otherwise, a magnetic recording layer can be also formed on the support by a metal deposition method using no binder such as sputtering, ion plating, electroplating or electroless plating, and recently, such recording layer prepared by the metal deposition method (i.e., a metal thin film type-recording layer) has been studied in detail for practical use. However, the metal thin film type-recording layer has drawbacks concerning various properties required for magnetic recording media such as resistance to weather, smooth running property, and resistance to abrasion (running durability). For example, the metal thin film type-recording layer having an extremely smooth surface is more difficult to be provided with high running durability, as compared with the conventional recording layer of coated type. For this reason, it has been proposed to further provide a lubricant layer or a protective layer on such recording layer to improve the running property or to enhance the running durability.

The protective layer for the metal thin film type-recording layer of a magnetic recording medium can be formed on the recording layer by coating an organic solvent solution of a thermoplastic resin, a thermosetting resin, a fatty acid, a metal salt of fatty acid, a fatty acid ester or an alkyl phosphoric acid ester over the recording layer, as described in Japanese Patent Provisional Publications No. 60(1985)-69824 and No. 60(1985)-85427.

SUMMARY OF THE INVENTION

It is an object of the present invention to provide a magnetic recording medium which is improved in both of the electromagnetic conversion characteristics and the running durability.

Particularly, the invention has an object to provide a magnetic recording medium having high electromagnetic conversion characteristics and showing stable and high running durability even when the temperature or the humidity largely varies, that is, less suffering from influences of variation of temperature or humidity.

There is provided by the present invention a magnetic recording medium comprising a nonmagnetic support and a magnetic recording layer containing a ferromagnetic powder which is provided on the support, characterized in that said magnetic recording layer further contains a binder resin having an acid residue or a salt thereof and a fatty acid ester compound having the formula (I):

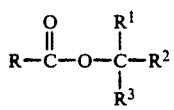

wherein R is a hydrocarbon group having 11–21 carbon atoms, $R^1$ is a hydrogen atom or a hydrocarbon group having 1–3 carbon atoms, each of $R^2$ and $R^3$ is a hydrocarbon group having 1–8 carbon atoms, and $R^2$ and $R^3$ are the same as or different from each other.

Alternatively, a lubricant layer containing the fatty acid ester compound of the formula (I) can be provided on the magnetic recording layer.

The magnetic recording medium of the present invention shows high electromagnetic conversion characteristics. Particularly, when the recording medium is used as a video tape, the video tape has a long still life in a still mode and shows high running durability. In addition, the video tape has a low friction coefficient in a wide temperature range and hardly brings about clogging on a magnetic head even under condition of low humidity. When the recording medium is used as a floppy disc, the disc shows high output as well as high running durability.

DETAILED DESCRIPTION OF THE INVENTION

A magnetic recording medium of the invention essentially comprises a nonmagnetic support and a magnetic recording layer containing a ferromagnetic powder which is provided on the support.

As the nonmagnetic support employable in the invention, there can be mentioned, for example, synthetic resin films such as films of polyethylene terephthalate, polypropylene, polycarbonate, polyethylene naphthalate, polyamide, polyamideimide and polyimide, and metallic foils such as aluminum foil and stainless steel foil. The thickness of the nonmagnetic support generally is in the range of 3 to 50 μm, preferably in the range of 5 to 30 μm.

The magnetic recording medium of the invention has a magnetic recording layer containing a ferromagnetic powder on the nonmagnetic support, as described above.

The present inventors have studied compounds when used as a lubricant which can improve the running durability of a magnetic recording medium having the aforementioned magnetic recording layer of coated type. As a result, they have found that the magnetic recording medium can be remarkably improved in its resistance to abrasion in the course of running in contact with members of a running system, such as a magnetic head and a guide pole. Also, friction coefficient against such members is significantly reduced by incorporating the fatty acid ester compound having the above formula (I) into the magnetic recording layer which contains a binder resin having an acid residue or a salt thereof in its molecular structure, or providing a layer of the fatty acid ester compound having the formula (I) on the magnetic recording layer using the acid residue (or its salt)-containing binder resin. The possible incorporation of the above fatty acid compound into a recording layer of a magnetic recording material is disclosed in Japanese Patent Provisional Publication No. 58(1983)-177526. However, even if the fatty acid ester compound is incorporated into a conventional magnetic recording layer, the resulting magnetic recording medium cannot be sufficiently improved in the running durability. The magnetic layer of the invention contains both the fatty acid ester compound and the above resin having an acid residue or a salt thereof. The above binder is supposed to be predominantly adsorbed on the surface of an inorganic powder such as a ferromagnetic powder owing to affinity of the acid residue or a salt thereof. As a result, the above fatty acid ester compound is hardly adsorbed on the surface of the ferromagnetic powder, so that the compound is apt to be located in the vicinity of the surface of the magnetic recording layer. Further, when a layer of the fatty acid ester compound is provided on a magnetic recording layer, the compound hardly penetrates into the magnetic recording layer for the same reason as above. Accordingly, the fatty acid ester compound exhibits sufficient lubricating action on the magnetic recording layer, so that the magnetic recording medium of the invention shows high running durability.

There is no specific limitation on the fatty acid ester compound employable in the invention, provided that the compound has the formula (I):

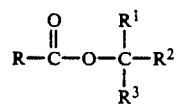

wherein R is a hydrocarbon group having 11–21 carbon atoms, $R^1$ is a hydrogen atom or a hydrocarbon group having 1–3 carbon atoms, each of $R^2$ and $R^3$ is a hydrocarbon group having 1–8 carbon atoms, and $R^2$ and $R^3$ are the same as or different from each other.

In the formula (I), R is preferably a hydrocarbon group having 13–17 carbon atoms and $R^1$ is preferably a hydrogen atom or a methyl group.

Examples of the fatty acid ester compounds having the formula (I) are as follows:

1-methylpropyl stearate, 1,1-dimethylethyl stearate, 1-methylbutyl stearate, 1-methylheptyl stearate, 1-methylhexyl stearate, 1-methyloctyl stearate, 1,1-dimethylbutyl stearate, and 1-ethyl-1-methylhexyl stearate;

1-methylpropyl palmitate, 1,1-dimethylethyl palmitate, 1-methylbutyl palmitate, and 1-methylheptyl palmitate;

1-methylhexyl myristate, 1-methyloctyl myristate, 1,1-dimethylbutyl myristate, and 1-ethyl-1-methylhexyl myristate;

1-methylpropyl oleate, 1,1-dimethylethyl oleate, 1-methylbutyl oleate, 1,1-dimethylbutyl oleate, and 1-ethyl-1-methylhexyl oleate; and 1-methylpropyl behenate, and 1,1-dimethylethyl behenate.

In the case of a magnetic recording layer of coated type (i.e., a magnetic recording layer mainly containing a ferromagnetic powder and a binder), the above-mentioned fatty acid ester compound can be incorporated into the recording layer or allowed to exist on the recording layer, for example, by the following three methods:

(1) The fatty acid ester compound is added to a magnetic paint for the formation of a magnetic recording layer.

(2) A layer of the fatty acid ester compound is provided on a surface of a nonmagnetic support prior to forming the recording layer.

(3) A layer of the fatty acid ester compound is provided on a surface of a magnetic recording layer after the recording layer is formed on the support.

The method (2) for providing a layer of the fatty acid ester compound between the magnetic recording layer and the support is a little inferior to other methods (1) and (3) from the viewpoint of the effect given by the present invention.

As the method (3), there can be utilized a method of coating or spraying an organic solvent solution of the fatty acid ester compound over the magnetic recording layer, and a method of subjecting the fatty acid ester compound to adsorption on the recording layer. In the adsorption method, the compound per se may be adsorbed by the surface of the recording layer or the recording layer may be immersed in an organic solvent solution of the compound (i.e., Langmuir Blodgett technique). In the method (3), the layer of the fatty acid ester compound can be provided on the recording layer at any desired time, for example, immediately after the magnetic paint is coated, while the coated layer of the magnetic paint is wet, after the coated layer of the magnetic paint is dried, after subjecting the magnetic recording layer to surface smoothening treatment, or after subjecting the magnetic recording layer to other mechanical treatment such as grinding treatment.

In the method (1) for adding the fatty acid ester compound to a magnetic paint for the formation of a coated type-magnetic recording layer, the amount of the fatty acid ester compound employable in the invention is preferably in the range of 0.2 to 4.0 wt. %, more preferably 0.5 to 2.0 wt. %, based on the ferromagnetic powder contained in the magnetic paint. In the method (2) for providing a layer of the fatty acid ester compound between the coated type-recording layer and the support, the amount of the compound (i.e., amount of the compound existing in the coated layer thereof after dryness) is preferably in the range of 10 to 200 mg/m². In the method (3) for providing a layer of the fatty acid ester compound on the surface of the coated type-recording layer not facing the support, the amount of the compound is preferably in the range of 1 to 500 mg/m², more preferably 5 to 150 mg/m².

There is no specific limitation on the ferromagnetic powder employable in the invention. Examples of the ferromagnetic powder include a ferromagnetic alloy powder, a ferromagnetic metal powder mainly containing iron, an iron oxide type ferromagnetic powder such as $\gamma\text{-Fe}_2\text{O}_3$ and $\text{Fe}_3\text{O}_4$, and a modified iron oxide type ferromagnetic powder such as Co-containing iron oxide, modified barium ferrite and modified strontium ferrite.

As the ferromagnetic metal powder, there can be mentioned a ferromagnetic alloy powder containing a metal component of at least 75 wt. % in which at least 80 wt. % of the metal component comprises at least one ferromagnetic metal or metal alloy (e.g., Fe, Co, Ni, Fe-Co, Fe-Ni, Co-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. These ferromagnetic metal powders are already known, and can be prepared by known methods.

There is no specific limitation on the shape of the ferromagnetic metal powder employable in the invention, and normally used is needle shape, grain shape, dice shape, rice shape or plate shape.

The binder employable for the formation of the magnetic recording layer of the invention can be selected from known resins such as thermoplastic resins, thermosetting resins, and reactive resins. These resins can be employed singly or in combination.

The thermoplastic resin employable in the invention generally has a mean molecular weight of 10,000 to 200,000 and a polymerization degree of approx. 200 to 2,000. Examples of the thermoplastic resin include vinyl chloride/vinyl acetate copolymer resins (e.g., vinyl chloride/vinyl acetate copolymer, vinyl chloride/vinyl acetate/vinyl alcohol copolymer and vinyl chloride/vinyl acetate/maleic anhydride copolymer), vinyl chloride/vinylidene chloride copolymer resins, acrylic resins (e.g., vinyl chloride/acrylonitrile copolymer, vinylidene chloride/acrylonitrile copolymer, (meth)acrylic acid ester/acrylonitrile copolymer, (meth)acrylic acid ester/vinylidene chloride copolymer, (meth)acrylic acid ester/styrene copolymer and butadiene/acrylonitrile copolymer), cellulose derivatives (e.g., cellulose acetate butyrate, cellulose diacetate, cellulose triacetate, cellulose propionate, cellulose acetate propionate, nitrocellulose and cellulose acetate), a variety of thermoplastic resins of synthetic rubber type (e.g., polybutadiene, chloroprene, polyisoprene and styrene butadiene copolymer), polyurethane resins, polyvinyl fluoride resins, polyamide resins, polyvinyl butylate resins, styrene/butadiene copolymer resins and polystyrene resins.

The thermosetting resin or the reactive resin employable in the invention generally has a mean molecular weight of not more than 200,000 in the state of a component of a coating dispersion, and the molecular weight of those resins becomes infinity after being coated through condensation reaction or addition reaction. Preferably employable thermosetting resin is one which does not soften or melt under heating in the course of hardening. Examples of such resins include phenol/formalin/novolak resin, phenol/formalin/resol resin, phenol/furfural resin, xylene/formalin resin, urea resin, melamine resin, drying oil alkyd resin, phenolic resin modified alkyd resin, maleic resin modified alkyd resin, unsaturated polyester resin, a mixture of epoxy resin and hardening agent such as polyamine, acid anhydride and polyamide resin, isocyanate polyether moisture-cure type resin, polyisocyanate prepolymer (e.g., a reaction product of diisocyanate and low-molecular triol containing three or more isocyanate groups in one molecule, and trimer or tetramer of diisocyanate), and a mixture of polyisocyanate prepolymer and a resin having active hydrogen (e.g., polyester polyol, polyether polyol, acrylic acid copolymer, maleic anhydride copolymer, 2-hydroxyethyl methacrylate copolymer, and p-hydroxystyrene copolymer).

Preferably employed as the binder is a combination of the vinyl chloride/vinyl acetate copolymer and the polyurethane resin which further contains a cellulose derivative.

As described hereinbefore, from the viewpoint of dispersing power and running durability of the resulting recording layer, the above-mentioned resin is required to have an acid residue such as $-SO_3H$, $-O-SO_3H$, $-PO_2H_2$, $-OPO_2H_2$ or $-COOH$, or salt thereof such as $-SO_3Na$ or $-O-SO_3Na$, in its molecular structure, and further may have hydroxyl group, an epoxy group or an amino group in the molecular structure.

The amount of the binder is generally in the range of 10 to 100 parts by weight, preferably in the range of 15 to 50 parts by weight, per 100 parts by weight of the ferromagnetic powder.

The magnetic recording layer of the magnetic recording medium according to the invention preferably further contains an inorganic powder having a Mohs' scale of hardness of not less than 5.

There is no specific limitation on the inorganic powder employable in the invention, provided that the powder has a Mohs' scale of hardness of not less than 5. Examples of the inorganic powder having a Mohs' scale of hardness of not less than 5 include $Al_2O_3$ (Mohs' scale of hardness: 9), $TiO_2$ (said hardness: 6.5), $SiO_2$ (said hardness: 7), $SnO_2$ (said hardness: 6.5), $Cr_2O_3$ (said hardness: 9), and $\alpha\text{-}Fe_2O_3$ (said hardness: 5.5). Preferred is an inorganic powder having a Mohs' scale of hardness of not less than 8. If an inorganic powder having a Mohs' scale of hardness of less than 5 is employed, the powder easily drops off from the magnetic recording layer and hardly has a function of abrasion for a magnetic head but causes clogging on the head, whereby the resulting recording medium deteriorates in the running durability.

The inorganic powder is contained in the magnetic recording layer in an amount of generally 0.1 to 20 parts by weight, preferably 1 to 10 parts by weight, based on 100 parts by weight of the ferromagnetic powder. The magnetic recording layer desirably contains carbon black (preferably having a mean particle size of 10–300 m$\mu$), etc. other than the above-mentioned components.

A process for the preparation of a magnetic recording medium of the present invention is described hereinafter, referring to a process comprising adding the above-mentioned fatty acid ester compound to a magnetic paint form forming a magnetic recording layer.

In the first place, the above-described ferromagnetic powder, binder, fatty acid ester compound, and if necessary other additives such as a lubricant or a filler are kneaded with an appropriate solvent to prepare a magnetic paint (or dispersion). The solvent employable in the invention is a known solvent used for the preparation of the conventional magnetic paint such as methyl ethyl ketone. The kneading procedure can be carried out by a known method conventionally used for the preparation of a magnetic paint. The order of addition of each component for the preparation of a magnetic paint can be appropriately selected. The magnetic paint can be prepared using a known kneading apparatus such as a two-roll mill, a three-roll mill, a ball mill, a pebble mill, a Tron mill, a sand grinder, a Szegvali attritor, a high-speed impeller dispersing apparatus, a high-speed stone mill, a high-speed impact mill, a disperser, a kneader, a high-speed mixer, a homogenizer and a ultrasonic dispersing apparatus.

In the preparation of a magnetic paint, other additives such as a dispersing agent and an antistatic agent can be also employed in combination with the above-mentioned components.

Examples of the dispersing agent employable in the invention include a fatty acid having 12–18 carbon atoms (e.g., caprylic acid, capric acid, lauric acid, myristic acid, palmitic acid, stearic acid, oleic acid, elaidic acid, linolic acid, linolenic acid and stearolic acid), a metallic soap composed of an alkali metal such as lithium, sodium or potassium and an alkaline earth metal such as magnesium, calcium or barium, a compound thereof in which at least one hydrogen is substituted by a fluorine atom, amide of the above-mentioned fatty acid, aliphatic amine, higher alcohol, polyalkylene oxide alkyl phosphoric acid ester, alkyl phosphoric acid ester, alkyl boric acid ester, sarcosinates, alkyl ether esters, trialkyl polyolefin oxyquaternary ammonium salt and lecithin. The dispersing agent is generally used in an amount of 0.1 to 10 parts by weight per 100 parts by weight of the employed binder.

Examples of the antistatic agent employable in the invention include conductive powders such as carbon black and carbon black grafted polymer; natural surfactants such as saponin; nonionic surfactants of alkylene oxide type, glycerol type or glycidol type; cationic surfactants such as higher alkylamines, quaternary ammonium salts, salts of pyridine or other heterocyclic compound, phosphonium and sulfonium; anionic surfactants containing acid group such as carboxylic acid, sulfonic acid, phosphoric acid, sulfuric acid ester group and phosphoric acid ester group; and amphoteric surfactants such as amines, aminosufonic acids, sulfuric acid ester or phosphoric acid ester of amino alcohol. In the case of using the conductive powder as an antistatic agent, the amount of the conductive powder is generally in the range of 0.1 to 10 parts by weight per 100 parts by weight of the employed binder. In the case of using the surfactant as an antistatic agent, the amount of the surfactant is generally in the range of 0.12 to 10 parts by weight per 100 parts by weight of the employed binder.

In the invention, it is also possible to use various lubricants in the preparation of a magnetic paint in combination with the above-described components. Examples of the lubricants include known solid powders such as a graphite powder, a molybdenum disulfide powder and a teflon powder, a small amount of higher alcohol, sorbitan oleate, mineral oils, animal oils, vegetable oils, olefin low polymers, and $\alpha$-olefin low polymers.

The above-mentioned additives such as a dispersing agent and an antistatic agent are by no means given under the restriction that those additives strictly have only the above-described functions. For example, the dispersing agent sometimes serves as an antistatic agent. Accordingly, it should be understood that the functions of the compounds exemplified above are by no means restricted to those classified above. In the case of using an additive having plural functions, the amount of the additive is determined under the consideration of those plural functions.

In the second place, the magnetic paint prepared as above is coated on a surface of the aforementioned non-magnetic support. Generally, a magnetic recording layer is formed by coating the magnetic paint directly on the nonmagnetic support, but it is also possible to provide an adhesive layer or a subbing layer between the magnetic paint layer and the nonmagnetic support. The coating procedure can be performed according to a conventional coating method such as an air doctor coating, a blade coating, a rod coating, an extrusion coating, an air knife coating, a squeeze coating, an impregnation coating, a reverse roll coating, a transfer roll coating, a gravure coating, a kiss coating, a cast coating, a spray coating and a spin coating. Other coating methods can be also applied to the present invention.

The magnetic recording layer provided on the surfaces of the nonmagnetic support has a thickness (thickness in dry state) generally in the range of approx. 0.5 to 10 μm, preferably in the range of 1.5 to 7.0 μm.

The magnetic recording layer provided on the non-magnetic support is generally subjected to orienting the ferromagnetic powder contained in the magnetic recording layer, that is, a magnetic orientation, in the case that the resulting magnetic recording medium is used in the form of a tape, and then subjected to a drying process. If necessary, the surface of the magnetic recording layer is subsequently subjected to a smoothening process. The obtained sheet is then cut or slit into a desired shape.

The examples and the comparison examples of the present invention are given below. In the following examples, the expression "parts" means "parts by weight", unless otherwise specified.

EXAMPLES 1-7

| Composition of Magnetic Paint | |
|---|---|
| Ferromagnetic metal powder (Fe—Zn—Ni alloy, Fe: 94 wt. %, Zn: 4 wt. %, Ni: 2 wt. %, coercive force (Hc): 700 Oe, specific surface area (S-BET): 30 m²/g) | 100 parts |
| Vinyl chloride/vinyl acetate/maleic anhydride copolymer (VMCH of Union Carbide Co., Ltd. containing about 2 wt. % of maleic acid) | 15 parts |
| Polyurethane resin (Niporan N2304, available from Nippon Polyurethane Co., Ltd.) | 10 parts |
| Lecithin | 3 parts |
| Oleic acid | 2 parts |
| Octyl laurate | 5 parts |
| Lauric acid | 5 parts |
| Fatty acid ester compound (kind and amount are indicated in Table 1) | |
| Carbon black (mean diameter: 20 nm) | 5 parts |
| Butyl acetate | 300 parts |
| Methyl ethyl ketone | 300 parts |

The above-listed components were kneaded in a ball mill for 48 hours. To the mixture was added 5 parts of polyisocyanate and the mixture was again kneaded for one hour to give a dispersion. The dispersion was filtered over a filter having a pore size of 1 μm to prepare a magnetic paint. The magnetic paint was coated on a surface of a polyethylene terephthalate support (thickness: 10 μm) to give a coated layer of the magnetic paint having thickness of 4.0 μm (thickness in dry state).

The support with the coated layer was treated with an electromagnet at 3,000 gauss under wet condition to give a magnetic orientation. After the coated layer was dried, the layer was subjected to supercalendering. The resulting sheet was slit to give a video tape having a width of 1 inch.

TABLE 1

| | Fatty Acid Ester Compound | Amount (by weight) |
|---|---|---|
| Example 1 | 1-methylpropyl stearate | 1.5 parts |
| Example 2 | " | 1.0 part |
| Example 3 | " | 0.8 part. |
| Example 4 | 1,1-dimethylethyl oleate | 2.0 parts |
| Example 5 | 1-ethyl-1-methylhexyl myristate | 1.5 parts |
| Example 6 | 1-methylbutyl stearate | 1.5 parts |
| Example 7 | 1,1-dimethylbutyl oleate | 1.5 parts |

EXAMPLES 8-12

The procedures of Examples 1-5 were repeated except for replacing the two binder resins with a combination of 15 parts of vinyl chloride/vinyl acetate copolymer (VAGH of Union Carbide Co., Ltd.) and 10 parts of polyester polyurethane resin (obtained by ring-opening and condensation polymerization, weight-average molecular weight: 40,000, number-average molecular weight: 20,000) having two —SO₃Na groups on average in one molecule) to prepare video tapes of Examples 8-12, respectively.

COMPARISON EXAMPLES 1-5

The procedures of Examples 1-5 were repeated except for replacing the vinyl chloride/vinyl acetate/maleic anhydride copolymer with the same amount of vinyl chloride/vinyl acetate (VAGH of Union Carbide Co., Ltd.) to prepare video tapes of Comparison Examples 1-5, respectively.

The video tapes obtained in the above-described examples were evaluated on the reproduction output sensitivity of radio frequency (RF) signal, lowering of output and friction coefficient according to the following tests.

REPRODUCTION OUTPUT SENSITIVITY OF RF SIGNAL

A video signal of 50IRE (The institute of Radio Engineers) was recorded on the video tape at a standard recording current using a 1-inch type video tape recorder (BVH1000 of Sony Corp., Ltd.). The recorded signal was reproduced to measure an average value of envelopes of the reproduction output of RF signal by means of an oscilloscope. The reproduction output sensitivity of RF signal was determined by introducing the obtained average value into the following formula:

Reproduction output sensitivity of RF signal (dB) = $20 \text{Log}_{10} V/V_O$ in which V means an average value and $V_O$ means a standard value.

LOWERING OF OUTPUT

A signal was recorded on the video tape for 60 minutes at 25° C. and 80% RH using the same video tape recorder as described above, and the recorded signal was repeatedly reproduced at 100 times to measure the reproduction outputs. The value of the reproduction output set forth in Table 2 is a relative value of reproduction output measured at the last reproduction of 100 times reproductions based on the output measured at the first reproduction being 0 dB.

Friction Coefficient

The video tape was brought into contact with a stainless pole at a contact angle of the tape and the pole of 180° under a tension of 50 g. ($T_1$) applied to the tape. Under such condition, a tension required for running the video tape at a speed of 3.3 cm/sec ($T_2$) was measured. A friction coefficient ($\mu$) of the video tape was determined by introducing the values of $T_1$ and $T_2$ into the following formula:

$$\text{Friction coefficient } (\mu) = 1/\pi \cdot \ln(T_2/T_1)$$

The test for measuring the friction coefficient was carried under the conditions of a temperature of 23° C. and a humidity of 10% RH.

The results on the above-described evaluations are set forth in Table 2.

TABLE 2

| | Reproduction Output Sensitivity of RF Signal (dB) | Friction Coefficient | Lowering of Output (−dB) |
|---|---|---|---|
| Example 1 | +1.5 | 0.22 | <1 |
| Example 2 | +1.0 | 0.21 | <1 |
| Example 3 | +1.0 | 0.20 | <1 |
| Example 4 | +1.0 | 0.23 | <1 |
| Example 5 | +1.0 | 0.23 | <1 |
| Example 6 | +1.0 | 0.21 | <1 |
| Example 7 | +1.0 | 0.21 | <1 |
| Example 8 | +2.0 | 0.21 | <1 |
| Example 9 | +1.5 | 0.20 | <1 |
| Example 10 | +1.0 | 0.20 | <1 |
| Example 11 | +1.0 | 0.22 | <1 |
| Example 12 | +1.0 | 0.22 | <1 |
| Com. Ex. 1 | 0 | 0.28 | 2 |
| Com. Ex. 2 | 0 | 0.27 | 2 |
| Com. Ex. 3 | 0 | 0.27 | 3 |
| Com. Ex. 4 | 0 | 0.31 | 2 |
| Com. Ex. 5 | 0 | 0.32 | 2 |

EXAMPLES 13–16

| Composition of Magnetic Paint | |
|---|---|
| Ferromagnetic metal powder (Fe—Zn—Ni alloy, Fe: 94 wt. %, Zn: 4 wt. %, Ni: 2 wt. %, coercive force (Hc): 1,500 Oe, specific surface area (S-BET): 54 m$^2$/g) | 100 parts |
| Vinyl chloride/vinyl acetate/maleic anhydride copolymer (400 × 110A, polymerization degree: 400, available from Nippon Zeon Co., Ltd., having —COOH group in the molecule) | 15 parts |
| Polyester polyurethane resin (obtained by ring opening and condensation polymerization, weight-average molecular weight: 40,000, number-average molecular weight: 20,000, having two —SO$_3$Na groups on average in one molecule) | 8 parts |
| α-Alumina abrasive, mean diameter: 0.2 μm) | 5 parts |
| Stearic acid | 1 part |
| Oleic acid | 0.5 part |
| Carbon black (mean diameter: 40 nm) | 2 parts |
| Methyl ethyl ketone | 300 parts |

The above-listed components were kneaded in a ball mill for 48 hours. To the mixture was added 5 parts of polyisocyanate, and the mixture was again kneaded for one hour to give a dispersion. The dispersion was filtrated over a filter having a pore size of 1 μm to prepare a magnetic paint. The magnetic paint was coated on a surface of a polyethylene terephthalate support (thickness: 10 μm) to give a coated layer of the magnetic paint having thickness of 4.0 μm (thickness in dry state).

The support with the coated layer was treated with an electromagnet at 3,000 gauss under wet condition to give a magnetic orientation. After the coated layer was dried, the layer was subjected to supercalendering. Independently, a fatty acid ester compound indicated in Table 3 was dissolved in n-hexane to prepare a solution. The solution was coated over the layer of the magnetic paint, and the coated layer of the solution was dried. The resulting sheet was slit to give a video tape having a width of 8 mm.

TABLE 3

| | Fatty Acid Ester Compound | Amount (mg/m$^2$) |
|---|---|---|
| Example 13 | 1 methylpropyl stearate | 5 |
| Example 14 | " | 15 |
| Example 15 | 1,1-dimethylethyl oleate | 20 |
| Example 16 | 1-methylbutyl stearate | 15 |

COMPARISON EXAMPLES 6–8

The procedures of Examples 13–15 were repeated except for replacing the two binder resins with a combination of 15 parts of vinyl chloride/vinyl acetate copolymer (VAGH of Union Carbide Co., Ltd.) and 10 parts of a polyurethane resin (Niporan NM-2304) to prepare video tapes of Comparison Example 6–8, respectively.

The video tapes obtained in the above-described examples were evaluated on lowering of the reproduction output and the friction coefficient according to the above-mentioned test procedure.

The results of evaluations on lowering of output and friction coefficient are set forth in Table 4.

TABLE 4

| | Friction Coefficient | Lowering of Output (−dB) |
|---|---|---|
| Example 13 | 0.22 | <1 |
| Example 14 | 0.21 | <1 |
| Example 15 | 0.20 | <1 |
| Example 16 | 0.23 | <1 |
| Com. Ex. 6 | 0.28 | 2 |
| Com. Ex. 7 | 0.27 | 3 |
| Com. Ex. 8 | 0.27 | 3 |

As is evident from the results set forth in Tables 1 to 4, each of the video tapes using the fatty acid ester compound according to the invention (Examples 1 to 16) showed high reproduction output, and was improved in both of running property and running durability.

We claim:

1. A magnetic recording medium comprising a nonmagnetic support and a magnetic recording layer containing a ferromagnetic powder which is provided on the support, wherein said magnetic recording layer contains a binder resin having an acid residue or a salt thereof in its molecular structure and a fatty acid ester compound having the formula (I):

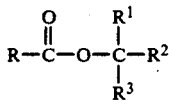

wherein R is a hydrocarbon group having 11–21 carbon atoms, $R^1$ is hydrogen atom or a hydrocarbon group having 1–3 carbon atoms, $R^2$ and $R^3$ are the same or different, each is a hydrocarbon group having 1–8 carbon atoms, and the total number of carbon atoms contained in $R^1$, $R^2$ and $R^3$ is not less than 3 carbon atoms.

2. The magnetic recording medium as claimed in claim 1, wherein R in the formula (I) is a hydrocarbon group having 13–17 carbon atoms, $R^1$ in the formula (I) is hydrogen or methyl, each of $R^2$ and $R^3$ is a hydrocarbon group having 1–8 carbon atoms.

3. The magnetic recording medium as claimed in claim 1, wherein said magnetic recording layer contains the fatty acid ester compound of the formula (I) in an amount of 0.2 to 4.0 wt. % based on the amount of the ferromagnetic powder.

4. The magnetic recording medium as claimed in claim 1, wherein said magnetic recording layer contains the fatty acid ester compound of the formula (I) in an amount of 0.5 to 2.0 wt. % based on the amount of the ferromagnetic powder.

5. The magnetic recording medium as claimed in claim 1, wherein said acid residue or a salt thereof is at least one polar group selected from the group consisting of —$SO_3H$, —O—$SO_3H$, —$PO_2H_2$, —$OPO_2H_2$, —COOH and salt thereof.

6. A magnetic recording medium comprising a non-magnetic support and a magnetic recording layer containing a ferromagnetic powder wherein said magnetic layer contains a binder resin having an acid residue or a salt thereof and a lubricant layer containing a fatty acid ester compound in an amount of 1 to 500 mg/m², the fatty acid ester compound having the formula (I):

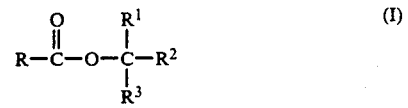

wherein R is a hydrocarbon group having 11–21 carbon atoms, $R^1$ is hydrogen atom or a hydrocarbon group having 1–3 carbon atoms, $R^2$ and $R^3$ are the same or different, each is a hydrocarbon group having 1–8 carbon atoms, and the total number of carbon atoms contained in $R^1$, $R^2$ and $R^3$ is not less than 3 carbon atoms, is provided on the magnetic recording layer.

7. The magnetic recording medium as claimed in claim 6, wherein R in the formula (I) is a hydrocarbon group having 13–17 carbon atoms, $R^1$ in the formula (I) is hydrogen or methyl, each of $R^2$ and $R^3$ is a hydrocarbon group having 1–8 carbon atoms.

8. The magnetic recording medium as claimed in claim 6, wherein said lubricant layer contains the fatty acid ester compound of the formula (I) in an amount of 5 to 150 mg/m².

9. The magnetic recording medium as claimed in claim 6, wherein said acid residue or a salt thereof is at least one polar group selected from the group consisting of —$SO_3H$, —O—$SO_3H$, —$PO_2H_2$, —$OPO_2H_2$, —COOH and salt thereof.

* * * * *